(12) United States Patent
Merry, Jr. et al.

(10) Patent No.: US 7,502,256 B2
(45) Date of Patent: Mar. 10, 2009

(54) SYSTEMS AND METHODS FOR REDUCING UNAUTHORIZED DATA RECOVERY FROM SOLID-STATE STORAGE DEVICES

(75) Inventors: David E. Merry, Jr., Bondsville, MA (US); Michael J. Hajeck, San Juan Capistrano, CA (US)

(73) Assignee: Siliconsystems, Inc., Aliso Viejo, CA (US)

( * ) Notice: Subject to any disclaimer, the term of this patent is extended or adjusted under 35 U.S.C. 154(b) by 903 days.

(21) Appl. No.: 11/000,134

(22) Filed: Nov. 30, 2004

(65) Prior Publication Data

US 2006/0117393 A1 Jun. 1, 2006

(51) Int. Cl.
*G11C 16/04* (2006.01)
*G11C 7/00* (2006.01)

(52) U.S. Cl. .................................. 365/185.04; 365/195
(58) Field of Classification Search ............. 365/185.04
See application file for complete search history.

(56) References Cited

U.S. PATENT DOCUMENTS

| | | | |
|---|---|---|---|
| 4,783,801 A | 11/1988 | Kaule | |
| 5,027,397 A | 6/1991 | Double et al. | |
| 5,530,828 A | 6/1996 | Kaki et al. | |
| 5,572,696 A | 11/1996 | Sonobe | |
| 5,758,121 A | 5/1998 | Fukuzumi | |
| 6,292,898 B1 | 9/2001 | Sutherland | |
| 6,320,787 B1 | 11/2001 | Ikeda | |
| 6,819,590 B2 | 11/2004 | Goda et al. | |
| 7,003,621 B2 * | 2/2006 | Koren et al. | 711/103 |
| 7,020,019 B2 * | 3/2006 | Salessi et al. | 365/185.04 |
| 7,048,197 B2 * | 5/2006 | Nishizawa et al. | 235/492 |
| 7,164,611 B2 * | 1/2007 | Kinsley | 365/195 |
| 2001/0029565 A1 | 10/2001 | Kaki et al. | |
| 2003/0206441 A1 | 11/2003 | Conley et al. | |
| 2006/0117393 A1 | 6/2006 | Merry, Jr. et al. | |
| 2007/0088905 A1 | 4/2007 | Salessi et al. | |

OTHER PUBLICATIONS

Office Action received in related U.S. Appl. No. 11/458,336, which was electronically received on Mar. 11, 2008.

* cited by examiner

*Primary Examiner*—Son L Mai
(74) *Attorney, Agent, or Firm*—Knobbe, Martens, Olson & Bear, LLP

(57) ABSTRACT

A memory system comprising one or more memory devices is purged to prevent unauthorized access to data stored therein. A host system passes control of purge operations to the memory system. The purge operations are configured to erase data, write a pattern to memory locations, physically damage the memory devices in the memory system, or combinations of the foregoing. The memory system can perform a purge operation on two or more memory devices in parallel. The memory system includes a destroy circuit to provide an over-current and/or over-voltage condition to the memory devices. The memory system also includes one or more isolation circuits to protect control circuitry in the memory system from the over-current and/or over-voltage condition. In some embodiments, the memory system includes a backup battery so it can complete a purge operation if it looses its power connection to the host system.

33 Claims, 5 Drawing Sheets

400

| Register | D7 | D6 | D5 | D4 | D3 | D2 | D1 | D0 |
|---|---|---|---|---|---|---|---|---|
| Feature | X ||||||||
| Sector Count | X |||||||||
| Sector Number | X |||||||||
| Cylinder Low | 00h |||||||||
| Cylinder High | 13h |||||||||
| Drive Head | 1 | X | 1 | Drive | X ||||
| Command | 81h |||||||||

| Register | D7 | D6 | D5 | D4 | D3 | D2 | D1 | D0 |
|---|---|---|---|---|---|---|---|---|
| Feature | 00h: Non-Destructive Purge, 01h: Destructive Purge |||||||||
| Sector Count | Number of Flash Devices to erase at a time |||||||||
| Sector Number | XXh |||||||||
| Cylinder Low | 13h |||||||||
| Cylinder High | 00h |||||||||
| Drive Head | 1 | X | 1 | Drive | X ||||
| Command | 82h |||||||||

412 — Register
414 — Feature, Sector Count
416 — Cylinder Low

FIG. 4B

SYSTEMS AND METHODS FOR REDUCING UNAUTHORIZED DATA RECOVERY FROM SOLID-STATE STORAGE DEVICES

BACKGROUND OF THE INVENTION

1. Field of the Invention

The present invention relates to solid-state storage devices. More specifically, the present invention relates to electrically erasing and/or physically damaging solid-state storage devices.

2. Description of the Related Art

Solid-state storage solutions are used to store a wide variety of data including sensitive information not intended for unauthorized users. For example, a host computer system may store a person's personal or financial information on a solid-state memory device such as an advanced technology attachment (ATA) flash disk or a removable flash memory card. A subsequent user's unauthorized access to the solid-state memory device could result in identity theft wherein the subsequent user misappropriates and misuses the personal and financial information. Solid-state storage solutions also store sensitive information including, for example, trade secrets, security information, military information, credit card information, or other information that a user desires to keep confidential.

One approach to reducing unauthorized access to data stored on a solid-state memory device is to electrically erase a memory array within the memory device. Conventional systems use industry standard command sets such as those provided by ATA, CompactFlash (CF) card or PC card (also know as a PCMCIA card) standards to erase memory arrays. Generally, a host sends standard read, erase and write commands to the memory device several times to ensure that the memory array is erased. Some systems also send additional commands to write a data pattern to the memory array to meet industry standard data sanitation specifications.

Such erase and sanitation procedures are cumbersome and generally require the host to repeatedly handshake with the memory device. Further, the host system will generally erase and sanitize multiple memory chips in a memory device sequentially with handshaking operations between erase operations. Thus, it can take several minutes or hours to complete an erase and sanitation procedure. In some applications such as avionics or power sensitive systems, sufficient time and/or power may not be available to adequately erase and sanitize the memory device. For example, it may not be possible to erase and sanitize the memory array during intermittent system power failures.

Solid-state memory arrays typically comprise a semiconductor material such as silicon or the like. Even when the memory array is erased, it may still be possible to retrieve data by examining the semiconductor material for the effects of hysteresis. In military or other security sensitive applications, such data retrieval is generally unacceptable. Thus, the memory array is typically physically destroyed using, for example, one or more instruments to gain access to and destroy the memory array. However, there is not always enough time to physically locate and destroy the memory array. For example, a pilot forced to land a military aircraft in enemy territory may have very little time to electrically erase or physically destroy sensitive information in the memory array.

SUMMARY OF THE INVENTION

Thus, it would be advantageous to develop a technique and system for performing purge operations such as erasing, sanitizing, and/or physically destroying a solid-state memory array. In one embodiment, a memory system comprising one or more memory devices is purged to prevent unauthorized access to data stored therein. A host system passes control of purge operations to the memory system. To save time, the memory system can perform a purge operation on two or more memory devices in parallel.

In one embodiment, the memory system includes a destroy circuit to provide an over-current and/or over-voltage condition to the memory devices. The memory system also includes one or more isolation circuits to protect control circuitry in the memory system from the over-current and/or over-voltage condition. In some embodiments, the memory system includes a backup battery so it can complete a purge operation if it looses its power connection to the host system.

According to the foregoing, the invention includes a method for inhibiting access to data stored in a memory array. The method includes receiving a predetermined sequence of commands, converting a first voltage signal to a second voltage signal sufficient to physically damage the memory array, isolating control circuitry from the second voltage signal, and providing the second voltage signal to the memory array.

The invention also includes a memory storage system comprising a memory array having a plurality of memory devices, a destroy circuit configured to physically damage the memory devices, and a controller to manage memory functions and to activate the destroy circuit.

The invention further comprises a system configured to reduce unauthorized data recovery. The system comprises a host system and a memory storage system that stores data for the host system. The memory storage system includes a memory array comprising a plurality of solid-state storage devices and a controller configured to erase two or more of the solid-state storage devices in parallel. The controller erases the two or more solid-state storage devices in response to receiving a predetermined sequence of messages from the host system.

The invention further includes circuitry for damaging a memory device. The circuitry comprises a voltage converter circuit configured to generate a voltage signal sufficient to damage the memory device, a first isolator and a second isolator. The first isolator is configured to selectively isolate the voltage converter circuit from the memory device. The second isolator is configured to selectively isolate the voltage converter circuit from an external controller.

The invention also includes a method of inhibiting access to data. The method comprises generating command data that specifies a purge operation for purging data from a storage system. The command data specifies a number of solid-state storage devices to be erased in parallel. The method also comprises sending the command data to the storage system to cause the storage system to perform the purge operation.

Neither this summary nor the following detailed description purports to define the invention. The invention is defined by the claims. For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Systems and methods which embody the various features of the invention will now be described with reference to the following drawings, in which:

FIG. 4A illustrates an exemplary data structure for a first purge command according to an embodiment of the invention;

FIG. 4B illustrates an exemplary data structure for a second purge command according to an embodiment of the invention.

DETAILED DESCRIPTION OF THE PREFERRED EMBODIMENT

Figure 1:
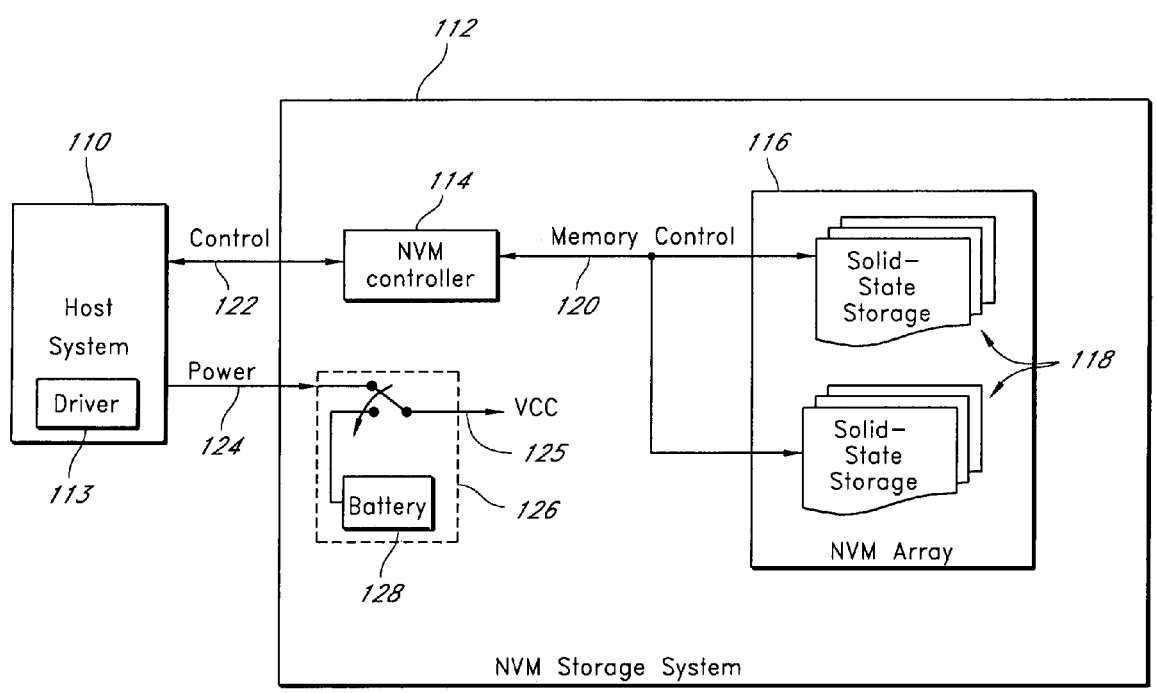
FIG. 1 is a block diagram illustrating a host system linked to a memory storage system according to an embodiment of the invention.

In an embodiment of the invention, a host system sends commands to a memory system comprising a memory array. The commands invoke a memory erase process, sanitize process, destroy process, or a combination of the forgoing, preferably without any additional intervention from the host system. Thus, control of erasing data, sanitizing data and/or destroying the memory array is passed from the host system to the memory system.

For memory systems with multiple memory devices or memory chips, the memory system erases, sanitizes or destroys the memory devices in parallel. Thus, the memory system can process the commands and erase, sanitize or destroy the memory array quickly as compared to conventional erase or sanitize procedures. For example, the memory system takes seconds to perform an erase procedure that would take a conventional system several minutes or hours to perform.

In one embodiment, the host system sends a series of commands to the memory system. To prevent accidental loss of data, the memory system only executes the process defined by the commands if a correct sequence of commands is received. The host system detects successful completion of the process by monitoring a status register and/or a pin on a host system bus connection. For example, the host system may monitor a pin generally described in industry standard specifications as a "ready/busy" pin. An artisan will recognize from the disclosure herein that other types of pins and/or status registers can be used. Thus, the process saves time and valuable host system power. If the host system is damaged, the memory system can continue to erase, sanitize and/or destroy the memory array with only a host power connection. In some embodiments, the memory system includes an internal power source such as a battery so it can complete an erase, sanitize and/or destroy process even if it loses its power connection with the host system.

The memory system preferably includes a destroy circuit to physically damage the memory array and reduce the likelihood of extracting data by, for example, examining the semiconductor material for the effects of hysteresis. In one mode of operation, the memory device activates the destroy circuit after performing an erase and/or sanitize process. When activated, the destroy circuit provides a voltage to the memory array sufficient to cause physical damage thereto and reduce the likelihood of extracting information from the memory array. Preferably, the destroy circuit provides a voltage sufficient to prevent the extraction of any meaningful data from the memory array.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

Purging a Memory Array

FIG. 1 is a block diagram illustrating a host system 110 linked to a non-volatile memory (hereinafter, "NVM") storage system 112. The host system 10 comprises a computer such as a personal computer, workstation or mainframe. For example, the host system may comprise a military system, a flight computer or other flight system avionics, a wearable computer used for military applications, a high-speed data recorder, a medical device, an industrial control system, an interactive kiosk, a personal digital assistant, a laptop computer, an interactive wireless communication device, a point-of-sale device, or the like.

The host system 110 stores data on the NVM storage system 112 and may provide operating system functionality and a boot process for the NVM storage system 112. The host system 110 includes a computer program represented in computer storage for generating command data that specifies write operations, read operations and purge operations as described herein. As discussed below, the command data specifies a number of solid-state storage devices 118 to be erased in parallel. The software may comprise, for example, a driver 113 configured to send the command data to the NVM storage system 112 to cause the storage system 112 to perform the read operation, the write operation, and/or the purge operation.

The NVM storage system 112 may comprise, for example, a solid-state memory card that plugs into a slot of the host system 110 and complies with at least one of the following card specifications: CompactFlash, PCMCIA, SmartMedia, MultiMediaCard, SecureDigital, Memory Stick, CompactFlash, PCMCIA, SmartMedia, MultiMediaCard, SecureDigital, Memory Stick, ATA/ATAPI. The NVM storage system 112 may, for example, have a housing and signal interface that complies with one of the following specifications: sub 1 inch hard disk drive, 1.8 inch hard disk drive, 2.5 inch hard disk drive and 3.5 inch hard disk drive. A custom form factor and/or signal interface may alternatively be used.

The NVM storage system 112 comprises a NVM controller 114 and a NVM array 116. In one embodiment, the NVM controller 114 executes a firmware program to perform processes as described herein and comprises an ATA flash disk controller available from Silicon Storage Technology, Inc. of Sunnyvale Calif. as part number SST55LD019A. The NMV controller 114 may, however, be implemented using one or more of the following: an application-specific integrated circuit (ASIC), a processor or other substrate configuration, program logic and/or software which operate as described herein or similar thereto. The NVM controller 114 may also comprise controller circuitry, processor circuitry, general purpose single-chip or multi-chip microprocessors, digital signal processors, embedded microprocessors, microcontrollers, combinations of the forgoing, or the like.

The NVM array 118 comprises a plurality of solid-state storage devices 118 coupled to the NVM controller 114. The solid-state storage devices 118 may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips.

The host system 110 exchanges control signals 122 with the NVM controller 114 to coordinate the reading and writing of data to and from the solid-state storage devices 118. The NVM controller 114 handles the read and write operations by sending memory control signals 120 to the NVM array 116. The control signals 122 may include, for example, read commands, write commands, or "purge" commands as described herein. The control signals 122 may be used to send commands selected from, for example, industry standard command sets such as those provided by ATA, CF card or PC card standards to read from or write data to standard storage devices. The host system 110 also provides one or more power signals 124 to the NVM storage system 112.

A user of the host system 110 may decide to erase and sanitize data stored on the solid-state storage devices 118. For example, the user may want to reduce the likelihood of unauthorized access to the data when the user is about to lose possession or control of the host system 110 or the NVM storage system 112. The user may also want to erase or sanitize the data, for example, when the data is no longer needed or when the user wants to free up memory space. The host system 110 may determine when to erase or sanitize the data based on a predetermined security protocol.

The host system 110 erases data stored in user data blocks on the solid-state storage devices 118 by sending a sequence of "purge" commands to the NVM controller 114. At least one of the purge commands instructs the NVM controller 114 to erase the solid-state storage devices 118. To prevent or reduce inadvertent loss of data in one embodiment, the NVM controller 114 will not erase the data unless it receives the purge commands in a predetermined sequence. For example, the host system 110 may send a first purge command followed by a second purge command having erase instructions to the NVM controller 114. If the NVM controller 114 receives the first purge command and second purge command within a predetermined amount of time and without intervening commands, the NVM controller 114 will execute the erase operation. As discussed in detail below, the purge commands may be implemented using, for example, vendor specific commands available in the ATA command set or the like. In other embodiments, the NVM controller may perform the purge operation upon receiving a single purge command.

The NVM controller 114 executes the erase operation without further instructions from the host system 110. Thus, continued handshaking is not needed to complete the operation. Rather, at the end of the operation, the NVM controller 114 updates a status register (not shown) or a status pin (not shown) to notify the host system 110 that the operation completed successfully. If the host system 110 fails or becomes disconnected from the NVM storage system 112, the data stored in the solid-state storage devices 118 will still be erased as long as the power signal 124 is still available to provide a source voltage 126 (hereinafter, the "VCC signal 125") to the NVM controller 114 and the NVM array 116. In some embodiments, the NVM storage system 112 also comprises a backup battery system 126, so that if the NVM storage system 112 loses the power signal 124 from the host system 110, an internal battery 128 provides the VCC signal 125.

In response to receiving the purge commands from the host system 110, the NVM controller 114 performs an erase operation wherein the user data blocks are erased. The NVM controller 114 erases the solid-state storage devices 118 in parallel by sending the memory control signals 120 to two or more of the solid-state storage devices 118 at the same time. Thus, the amount of time spent erasing the solid-state storage devices 118 is reduced as compared to conventional systems that erase memory chips sequentially using a handshaking protocol. As discussed in detail below, erasing the solid-state storage devices 118 in parallel increases the amount of current used to perform the operation. To control the amount of current consumed during the operation, a programmer of the host system's computer program can select the number of solid-state storage devices 118 to erase in parallel, as described below. The selection may be based at least in part on the time required to erase the solid-state storage devices in comparison to the amount of current used.

In addition to the erase operation, the user may also initiate a sanitize operation that writes a pattern to the user data blocks. Writing a pattern to the user data blocks makes it more difficult to extract sensitive information by examining the effects of hysteresis after the sensitive information has been erased. The host system 110 may send, for example, a first purge command followed by a second purge command instructing the NVM controller 114 to write the pattern to the user data blocks. In one embodiment, the NVM controller 114 will not execute the sanitize operation unless it receives the purge commands in sequence. The NVM controller 114 can write a pattern in parallel by sending memory control signals 120 to two or more of the solid-state storage devices 118 at the same time.

In addition to erasing and/or writing a pattern to the user data blocks in the solid-state storage devices 118, the user may decide to erase non-user data blocks including blocks comprising, for example, firmware, bad block tables, parity data, control structures, or the like. Such an operation renders the NVM storage system 112 inoperable such that it cannot be read from the host system 110 or other systems.

Physically Damaging a Memory Array

Figure 2:
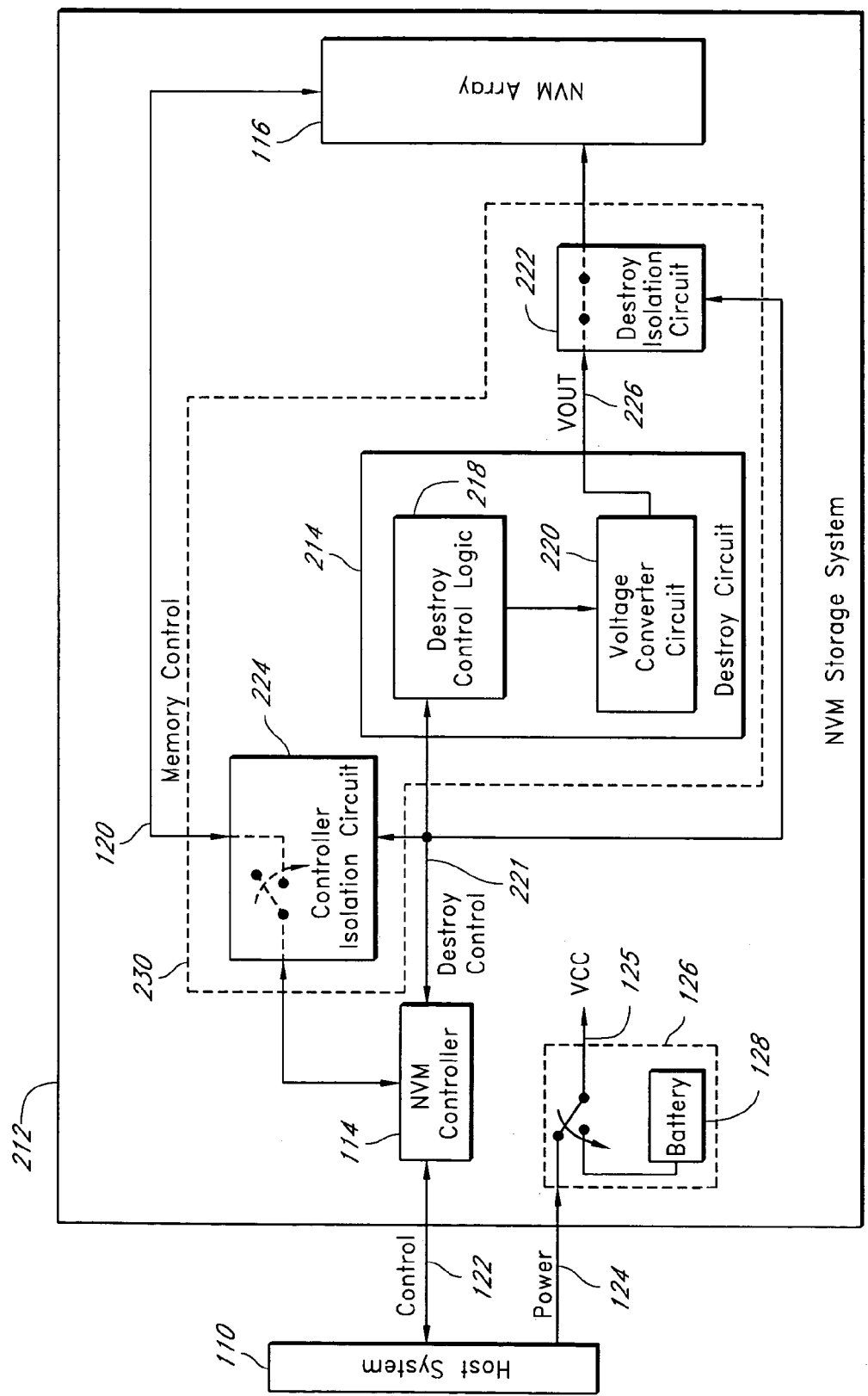
FIG. 2 is a block diagram illustrating a host system linked to a memory storage system comprising a destroy circuit according to an embodiment of the invention.

FIG. 2 is a block diagram illustrating a host system 110 linked to a NVM storage system 212 comprising a destroy circuit 214. As with the NVM storage system 112 shown in FIG. 1, the NVM storage system 212 shown in FIG. 2 includes a NVM controller 114 and a NVM array 116 comprising one or more solid-state storage devices (not shown). The NVM storage system 212 also includes a backup battery system 126 having a battery 128 to provide the VCC signal 125 to the NVM storage system 212 circuitry if a power signal 124 from the host system 110 is disconnected or terminated.

The NVM controller 114 is configured to perform the erase and sanitize operations discussed above in relation to FIG. 1 by sending memory control signals 120 to the NVM array 116. The NVM controller 114 is also configured to physically damage semiconductor material in the NVM array 116 by applying an over-voltage condition, an over-current condition, or both over-voltage and over-current conditions thereto. Such a procedure is referred to herein as a "physical damage" operation and reduces the likelihood of extracting data from the NVM array 116 by, for example, examining the semiconductor material therein for the effects of hysteresis.

The destroy circuit 214 comprises destroy control logic 218 and a voltage converter circuit 220. The destroy control logic 218 is configured to receive a destroy control signal 221 from the NVM controller 114 and to activate the voltage converter circuit 220. The voltage converter circuit 220 is configured to convert the VCC signal 125 to a "VOUT" signal 226 at a voltage level and/or current level sufficient to physically damage the NVM array 116.

For example, in some embodiments the VCC signal 125 is approximately 5V. In other embodiments, the VCC signal 125 ranges from approximately 3V to approximately 12V. The voltage converter circuit 220 is configured to receive the VCC signal 125 and to generate a VOUT signal 226 that is approximately 20V to 30V and capable of providing approximately 500 mA to 2 A of current. In some embodiments, bond wires in the NVM array are destroyed when approximately 1 A of current is applied thereto. To avoid destroying the bond wires before physically damaging the semiconductor material, the voltage converter circuit 220 generates a VOUT signal 226 that is approximately 20V to 28V and provides approximately 700 mA to 1.5 A of current. In other embodiments, the VOUT signal is approximately 80V to 100V and provides approximately 200 mA to 650 mA of current. An artisan will recognize from the disclosure herein that these voltage and current ranges for the VOUT signal 226 are provided for exemplary purposes only, and that other values outside these ranges are possible and may depend on such factors as the type of memory chips used in the NVM array 116.

The NVM storage system 212 comprises a destroy isolation circuit 222 and a controller isolation circuit 224. To prevent inadvertent damage to the NVM storage system 212, the destroy isolation circuit 222 and the controller isolation circuit 224 isolate the voltage converter circuit 220 from the NVM controller 114. One purpose of the destroy isolation circuit 222 and the controller isolation circuit 224 is to allow the NVM controller 114 to continue to operate as the destroy operation is performed so that the operation completes successfully and is reported to the host system 110. In one embodiment, at least one of the destroy isolation circuit 222 and the controller isolation circuit 224 comprise an optoisolator (not shown) such as a PS7214-1A solid-state relay from NEC Compound Semiconductor Devices. The NVM controller 114 controls the destroy isolation circuit 222 and the controller isolation circuit 224 with the destroy control signal 221.

The VOUT signal 226 is coupled to input and/or output pins (not shown) of the memory chips in the NVM array 116 through the destroy isolation circuit 222. The input and output pins are also coupled to the NVM controller 114 through the controller isolation circuit 224. To prevent the NVM controller 114 and the voltage converter circuit 220 from being coupled to the input and/or output pins at the same time, the NVM controller 114 maintains the destroy isolation circuit 222 and the controller isolation circuit 224 in opposite states (i.e., one isolates while the other does not isolate).

When the NVM controller 14 is not performing a physical damage operation, the destroy isolation circuit 222 isolates the VOUT signal 226 from the NVM array 116 and the controller isolation circuit 224 couples the NVM controller 114 to the NVM array 116. Thus, the NVM controller 114 and the NVM array 116 can exchange memory control signals 120 to perform read operations, write operations, erase operations, sanitize operations, or the like. Thus, the NVM controller 114 manages the NVM array 116 during normal host system access to the NVM array 116.

The host system 110 initiates a physical damage operation by sending a sequence of commands to the NVM controller 114. To prevent inadvertent damage to the NVM storage system 212, the NVM controller 114 preferably will not execute the commands unless they are received in a predetermined sequence. For example, the host system 110 may send a first purge command followed by a second purge command with instructions to damage the NVM array 116. If the NVM controller 114 receives the purge commands within a predetermined amount of time and without intervening commands, the NVM controller 114 executes the physical damage operation.

The NVM controller 114 executes the physical damage operation by activating the destroy control signal 221 provided to the destroy circuit 214, the destroy isolation circuit 222 and the controller isolation circuit 224. In response to the destroy control signal 221, the destroy isolation circuit 222 couples the VOUT signal 226 to the NVM array 116 and the controller isolation circuit 224 isolates the NVM controller 114 from the NVM array 116.

In the destroy circuit 214, the destroy control logic 218 responds to the destroy control signal 221 by activating the voltage converter circuit 220. In some embodiments the destroy control logic 218 may wait to activate the voltage converter circuit 220 until predetermined conditions are satisfied. For example, the destroy control logic 218 may wait to active the voltage converter circuit 220 until the VCC signal 125 is available or until it receives confirmation that the controller isolation circuit 224 has successfully isolated the NVM controller 114 from the NVM array 116. Some embodiments do not include the destroy control logic 218. In such embodiments, the destroy control signal 221 activates the voltage converter circuit 220. Regardless of whether the NVM storage system 112 includes the destroy control logic, once the voltage converter circuit 220 is activated, it generates the VOUT signal 226, which damages the semiconductor material in the NVM array 116 as discussed above. Upon such activation, the VOUT signal 226 may, for example, remain at approximately 20V to 30V for approximately 3 seconds to 30 seconds. However, in some embodiments, the VOUT signal 226 remains at approximately 20V to 30V for substantially longer than 30 seconds including, for example, several minutes or hours.

In one embodiment, the destroy circuit 214, the destroy isolation circuit 222 and the controller isolation circuit 224 collectively operate as a destroy/isolation circuit 230 usable to physically damage a wide variety of memory devices and other circuitry. For example, the destroy/isolation circuit 230 can be used to physically damage flash bios or other data stored in a read only memory (ROM) device on a computer motherboard while protecting other circuitry on the motherboard. As another example, the destroy/isolation circuit 230 can be used to physically damage volatile memory devices such as random access memory (RAM) devices, or the like.

Destroy Circuitry

Figure 3:
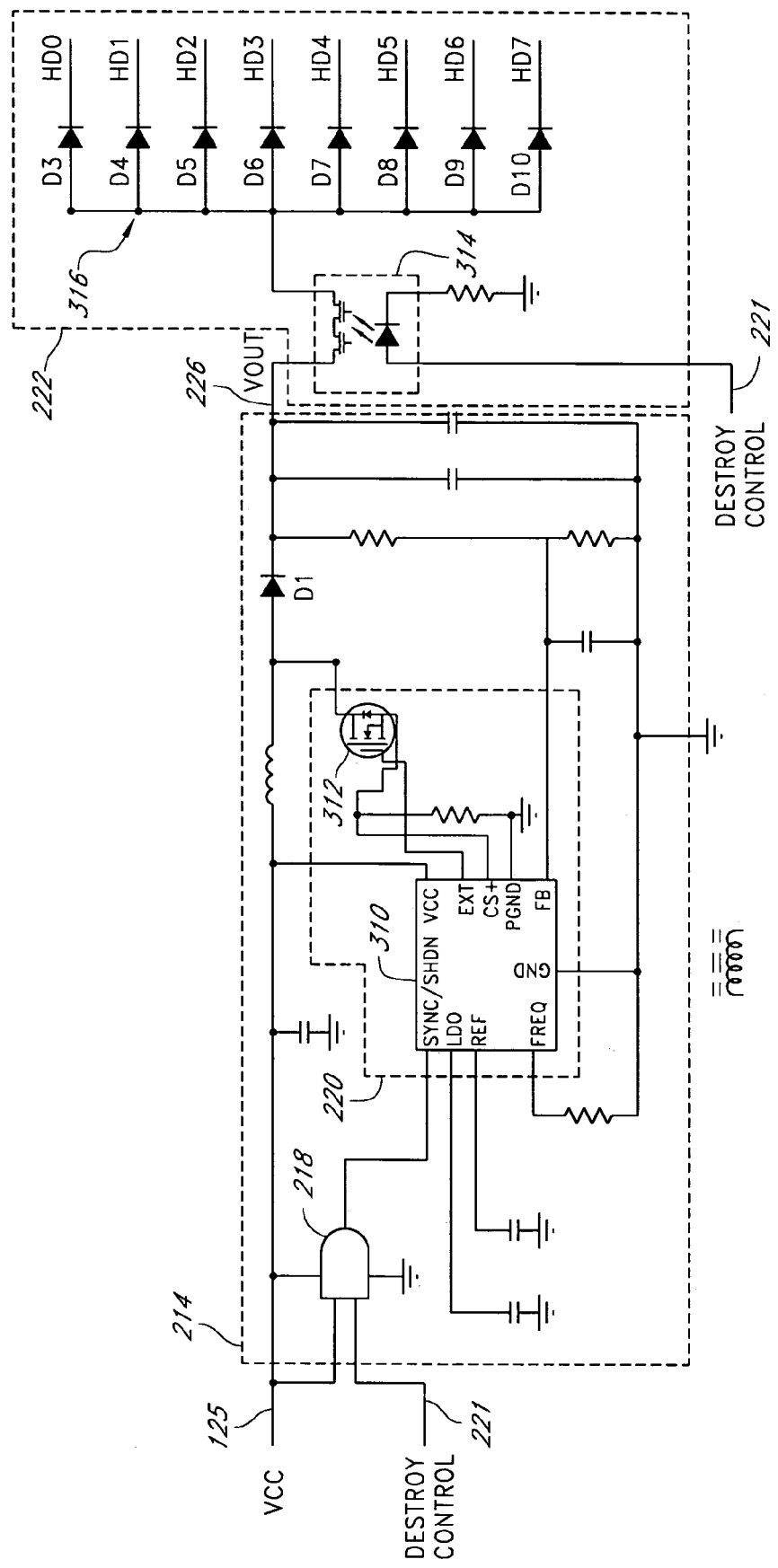
FIG. 3 is a schematic diagram illustrating an exemplary destroy circuit and an exemplary destroy isolation circuit usable by the storage system shown in FIG. 2 according to an embodiment of the invention.

FIG. 3 is a schematic diagram according to an embodiment of the invention illustrating an exemplary destroy circuit 214 and an exemplary destroy isolation circuit 222 usable by the NVM storage system 120 shown in FIG. 2. The destroy circuit 214 comprises destroy control logic 218 and a voltage converter circuit 220. The voltage converter circuit 220 comprises a DC-to-DC converter 310 and a power MOSFET 312 configured in a "fly-back" or "charge pump" configuration. In one embodiment, the DC-to-DC converter 310 comprises a MAX668 pulse-width modulating (PWM) step-up controller available from Maxim Integrated Products, Inc. of Sunnyvale Calif.

The destroy control logic 218 is configured to activate the DC-to-DC converter 310 when it receives the VCC signal 125 and the Destroy control signal 221. The DC-to-DC converter 310 is configured to drive the power MOSFET 312 to generate the VOUT signal 226. Exemplary voltage level and current levels for the VOUT signal 226 are provided above. The VOUT signal 226 is provided through a diode D1 to the destroy isolation circuit 222.

The destroy isolation circuit 222 comprises an optoisolator 314 and a diode array 316 comprising a plurality of diodes (eight shown as diodes D3-D10). The optoisolator 314 is controlled by the destroy control signal 221. During normal read or write operations, or during erase or sanitize operations, the optoisolator 314 sinks the VOUT signal's current. However, when the destroy control signal 221 activates the DC-to-DC converter 310, it also activates the optoisolator 314 so as to provide the VOUT signal 226 to the diode array 316.

The diode array 316 is configured to couple the VOUT signal 226 to memory device input pins (i.e., control or command pins) and/or output pins. In FIG. 3, the input and/or output pins are represented by HD0-HD7. The diode array 316 is connected in parallel to two or more memory devices in the NVM array. Thus, the destroy circuit 214 physically damages the memory devices at the same time, saving time and power.

Applying the VOUT signal 226 to an input pin of a memory device damages a portion of the semiconductor material. However, it may also create short circuits that prevent additional damage to other portions of semiconductor material when the VOUT signal 226 is applied to other input pins. Thus, in some embodiments the diode array 316 is configured to apply the VOUT signal 226 to a plurality of input pins of a particular memory device at the same time. In addition, or in other embodiments, the VOUT signal 226 is applied to one or more output pins after being applied to the input pins. For example, in one embodiment a substantial amount of damage is caused by applying the VOUT signal 226 to one input pin and four output pins.

Purge Commands

FIGS. 4A and 4B illustrate exemplary command formats for a first purge command 400 and a second purge command 410 according to an embodiment of the invention. The first purge command 400 and the second purge command 410 are vendor specific commands in the ATA command set and, as such, include register fields to specify features, sector count, sector number, cylinder low, cylinder high, drive head, and command information. In this example, each register field includes eight bits (i.e., $D_0$-$D_7$). An "X" indicates that the corresponding portion of the register field can have any value.

The first purge command 400 and the second purge command 410 may be sent, for example, as control signals 122 from the host system 110 to the NVM controller 114 shown in FIG. 1 or 2. The NVM controller 114 will not execute the purge commands, however, unless the first purge command 400 and the second purge command 410 are received in sequence. Thus, the likelihood of inadvertently performing a purge function is reduced.

The first purge command 400 indicates that the host system 110 has initiated a purge operation. The purge operation may be a non-destructive purge operation or a destructive purge operation. A non-destructive purge operation erases the user data blocks. In some embodiments, the non-destructive purge operation also writes a pattern to the user data blocks. In addition or in other embodiments, erasing data and writing a pattern to user data blocks are separate operations and the storage system 110 sends a unique set of purge commands 400, 410 for each.

A destructive purge operation erases the user data blocks along with other data including firmware, bad block table, parity data, and control structures stored in the NVM array 116. The destructive purge operation renders the storage system inoperable. In some embodiments, the destructive purge operation also causes physical damage to the memory devices using, for example, the destroy circuit 214 shown in FIG. 2. In other embodiments, rendering the storage system inoperable and physically damaging the memory devices are separate operations and the host system 110 sends a unique set of purge commands 400, 410 for each.

However, in a preferred embodiment, one set of purge commands 400, 410 instructs the NVM controller 114 to purge the NVM array 116 in two phases. In a first phase, the NVM controller 114 erases and/or writes a pattern to the memory devices. In a second phase, the NVM controller 114 physically damages the memory devices, as discussed herein. Thus, if the NVM controller 114 cannot destroy all of the memory devices due to, for example, failure of the internal battery 128, the data therein will still have been erased and/or written over.

An artisan will recognize from the disclosure herein that other operation combinations are possible including, for example, a single operation to erase user data blocks and physically damage the memory device. By combining operations, the host system 110 can pass more control to the NVM controller 114 when it sends the first purge command 400 and the second purge command 410. For example, if a single operation includes erasing user data blocks, writing a data pattern to the user data blocks, and physically damaging the memory device, the host system 110 can send one set of purge commands 400, 410 to the NVM controller 114. The NVM controller 114 can then perform each of these functions without further instructions from the host system 110.

After the host system 110 initiates the purge operation by sending the first purge command 400, the host system 110 then specifies the specific purge operation by sending the second purge command 410 to the NVM controller 114. In the example shown in FIG. 4B, the host system 110 sets the feature register 412 in the second purge command 410 to "0" to initiate a non-destructive purge operation and "1" to initiate a destructive purge operation. As discussed above, an artisan will recognize from the disclosure herein that the feature register 412 in the second purge command 410 can specify other operations or combinations of operations.

The sector count register 414 in the second purge command 410 defines the number of memory devices to be erased at a time and the sector number register 416 in the second purge command 410 defines a data pattern to write to the memory devices. If, for example, the sector count register 414 specifies erasing four memory devices at a time, the NVM controller 114 erases a first set of four memory devices in parallel.

Once the first set of four memory devices is erased, the NVM controller 114 erases a second set of four memory devices in parallel. The NVM controller 114 repeats this process until all of the memory devices in the NVM array 116 are erased.

Figure 5:
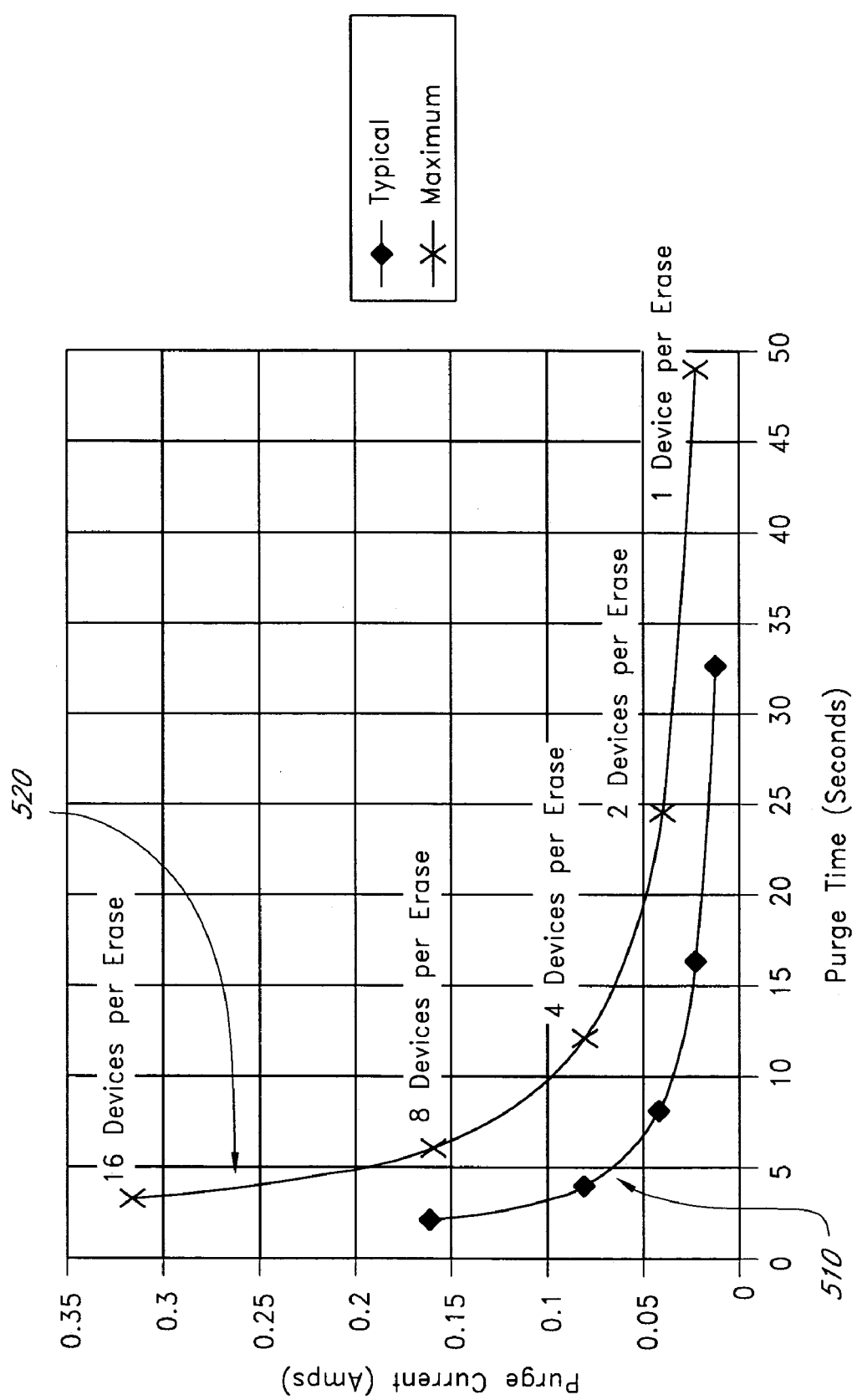
FIG. 5 is a first graph and a second graph illustrating the relationship between the amount of time spent erasing a memory array and the current consumed while erasing the memory array.

Erasing two or more memory devices in parallel reduces the amount of time spent erasing the NVM array 116. However, it also increases the amount of current used to erase the NVM array 116. For example, FIG. 5 illustrates a first graph 510 and a second graph 520 showing the relationship between the amount of time spent erasing a memory array (i.e., "purge time") and the current consumed while erasing the memory array (i.e., "purge current").

The exemplary graphs 510, 520 corresponds to erasing a memory array comprising sixteen 1 Gb flash memory devices. The first graph 510 corresponds to typical measured values for the purge time versus the purge current. The second graph 520 corresponds to expected maximum values for the purge time versus the purge current. Data points are shown for erasing one memory device at a time, two memory devices at a time, four memory devices at a time, eight memory devices at a time, and all sixteen memory devices at a time.

The least amount of current is consumed when the sixteen memory devices are erased one at a time. However, erasing the memory devices sequentially also takes the most time. As more memory devices are erased in parallel, the purge time decreases and the purge current increases. The quickest purge times occur when all sixteen memory devices are erased in parallel. However, this also uses the most purge current. Thus, there is a trade-off between purge time and purge current.

Returning to FIG. 4B, the sector count register 414 in the second purge command 410 allows a programmer of the host system's computer program, as discussed above, to specify the number of memory devices to erase at a time. The programmer can selectively specify the number of memory devices to erase in parallel based on factors such as the power available in a particular application, the overall number of memory devices to erase, the size of the memory devices (i.e., the number of bytes), personal preference, the urgency of a particular situation, combinations of the forgoing, or the like. In addition, or in other embodiments, the programmer can selectively specify the number of memory devices to physically damage at a time.

In addition, or in other embodiments, the NVM controller 114 can respond to the second purge command 410 by selecting the number of memory devices to erase and/or destroy at a time. The NVM controller 114 can selectively specify the number of memory devices to erase and/or physically damage in parallel based on factors such as a state of the internal battery 128, disconnection from the host system 110, and/or other criteria. For example, the NVM controller 114 may monitor the power remaining in the internal battery 128 and alter the number of memory devices when the power drops below a predetermined level.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method for inhibiting access to data stored in a memory array, the method comprising:

receiving a predetermined sequence of commands;
in response to receiving the predetermined sequence of commands, converting a first voltage signal to a second voltage signal sufficient to physically damage the memory array;
isolating control circuitry from the second voltage signal;
providing the second voltage signal to the memory array, and
erasing a plurality of memory devices in parallel based on the predetermined sequence of commands.

2. The method of claim 1, wherein receiving the predetermined sequence of commands comprises receiving a first command and a second command from a host system.

3. The method of claim 1, wherein converting the first voltage signal to the second voltage signal comprises generating a voltage of substantially 20 to 30 volts at substantially 500 milliamps to 2 amps of current.

4. The method of claim 3, further comprising limiting the current to less than 1 amp.

5. The method of claim 1, wherein providing the second voltage signal to the memory array comprises providing the second voltage signal in parallel to two or more memory devices in the memory array.

6. The method of claim 1, further comprising erasing two or more memory devices in the memory array in parallel.

7. The method of claim 1, further comprising writing a pattern to two or more memory devices in the memory array in parallel.

8. The method of claim 1, further comprising physically damaging a plurality of memory devices in parallel based on the predetermined sequence of commands.

9. A memory storage system comprising:
a memory array comprising a plurality of memory devices;
a destroy circuit configured to physically damage the memory devices;
a controller to manage memory functions and to activate the destroy circuit; and
isolation circuitry configured to electrically isolate the controller from the destroy circuit, the isolation circuitry comprising:
a first optoisolator configured to selectively isolate the destroy circuit from the memory array; and
a second optoisolator configured to selectively isolate the controller from the memory array, wherein the second optoisolator isolates the controller from the memory array when the memory array is being physically damaged.

10. The memory storage system of claim 9, wherein the memory devices comprise flash memory devices.

11. The memory storage system of claim 9, wherein the destroy circuit comprises voltage converter circuitry configured to convert a first voltage signal to a second voltage signal, wherein the second voltage signal is sufficient to physically damage the memory array.

12. The memory storage system of claim 11, wherein the voltage converter circuitry comprises:
a DC-to-DC converter; and
a power MOSFET, wherein the DC-to-DC converter is configured to drive the power MOSFET.

13. The memory storage system of claim 9, wherein the controller is configured to manage the memory functions and to activate the destroy circuit in response to commands received from a host system.

14. A memory storage system comprising:
a memory array comprising a plurality of memory devices;
a destroy circuit configured to physically damage the memory devices; and a controller to manage memory functions and to activate the destroy circuit, wherein the controller is configured to manage the memory functions and to activate the destroy circuit in response to commands received from a host system, wherein the memory functions comprise one or more operations selected from the group comprising writing data to the memory devices, reading data from the memory devices, erasing data from the memory devices, and writing a pattern to the memory devices.

15. The memory storage system of claim 14, wherein the controller is configured to erase data from two or more of the memory devices in parallel.

16. The memory storage system of claim 14, wherein the controller is configured to write a pattern to the two or more memory devices in parallel.

17. The memory storage system of claim 14, wherein the controller is configured to physically damage the two or more memory devices in parallel.

18. The memory storage system of claim 9, wherein the memory storage system is a solid-state memory card that complies with at least one of the following card specifications: CompactFlash, PCMCIA, SmartMedia, MultiMedia Card, SecureDigital, Memory Stick, ATA/ATAPI.

19. The memory storage system of claim 9, wherein the memory storage system comprises a housing and signal interface that complies with one of the following specifications: sub 1 inch hard disk drive, 1.8 inch hard disk drive, 2.5 inch hard disk drive and 3.5 inch hard disk drive, PC card CompactFlash, PCMCIA, SmartMedia, MultiMediaCard, SecureDigital, Memory Stick.

20. A memory storage system comprising:
a memory array comprising a plurality of memory devices;
a destroy circuit configured to physically damage the memory devices; and
a controller to manage memory functions and to activate the destroy circuit,
wherein the controller selects a plurality of memory devices to erase in parallel based on command information received from a host.

21. A memory storage system comprising:
a memory array comprising a plurality of memory devices;
a destroy circuit configured to physically damage the memory devices; and
a controller to manage memory functions and to activate the destroy circuit,
wherein the controller implements a command format in which a host specifies to the memory storage system how many memory devices are to be physically damaged in parallel.

22. A system configured to reduce unauthorized data recovery, the system comprising:
a host system; and
a memory storage system that stores data for the host system, the memory storage system comprising:
a memory array comprising a plurality of solid-state storage devices;
a controller configured to erase two or more of the solid-state storage devices in parallel, wherein the controller erases the two or more solid-state storage devices in response to receiving a predetermined sequence of messages from the host system; and
destroy circuitry, the destroy circuitry comprising:
voltage converter circuitry configured to convert a first voltage signal to a second voltage signal, wherein the second voltage signal is sufficient to physically damage the two or more solid-state storage devices; and
destroy control logic that activates the voltage converter circuitry in response to receiving a control signal from the controller.

23. The system of claim 22, wherein the memory storage system receives the first voltage signal from the host system.

24. The system of claim 23, wherein the memory storage system further comprises a backup power system configured to generate the first voltage signal if the host system fails.

25. The system of claim 22, wherein the destroy circuitry comprises:
a DC-to-DC converter; and
a power MOSFET, wherein the DC-to-DC converter is configured to drive the power MOSFET to generate the second voltage signal.

26. The system of claim 22, wherein the memory storage system further comprises isolation circuitry configured to isolate the controller from the destroy circuitry.

27. Circuitry for damaging a memory device, the circuitry comprising:
a voltage converter circuit configured to generate a voltage signal sufficient to damage the memory device;
a first isolator configured to selectively isolate the voltage converter circuit from the memory device; and
a second isolator configured to selectively isolate the memory device from an external controller,
wherein at least one of the first isolator and the second isolator comprises an optoisolator.

28. The circuitry of claim 27, further comprising destroy control logic configured to activate the voltage converter circuit in response to a signal received from the controller.

29. The circuitry of claim 27, wherein the voltage converter circuit comprises:
a DC-to-DC converter; and
a power MOSFET, wherein the DC-to-DC converter is configured to drive the power MOSFET.

30. A method of inhibiting access to data, comprising:
generating command data that specifies a purge operation for purging data from a storage system, wherein the command data specifies a plurality of solid-state storage devices to be erased in parallel; and
sending the command data to the storage system to cause the storage system to perform the purge operation,
wherein the purge operation is an operation that causes physical damage to the solid-state storage devices.

31. The method of claim 30, wherein the command data is formatted in accordance with an ATA specification.

32. A method of inhibiting access to data, comprising:
generating command data that specifies a purge operation for purging data from a storage system, wherein the command data specifies a plurality of solid-state storage devices to be erased in parallel; and
sending the command data to the storage system to cause the storage system to perform the purge operation,
wherein the command data specifies a destructive purge operation in which the storage system initially writes a predetermined pattern of data to the solid-state memory devices, and then applies a voltage that causes physical damage to the solid-state memory devices.

33. A computer program which, when executed by a host computer, causes the host computer to perform the method of claim 30, said computer program represented in computer storage.

* * * * *